C. H. TAYLOR AND H. J. ALPE.
SCREW THREAD GAGE.
APPLICATION FILED NOV. 29, 1918.
1,354,587.
Patented Oct. 5, 1920.
4 SHEETS—SHEET 3.
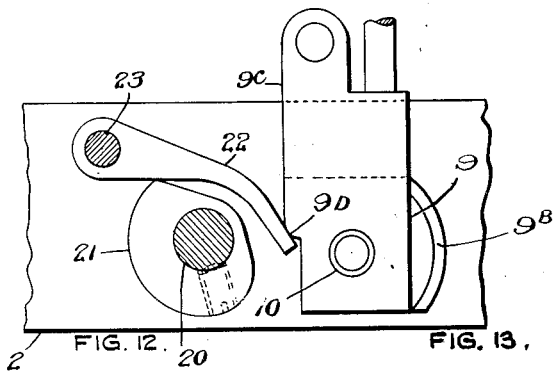
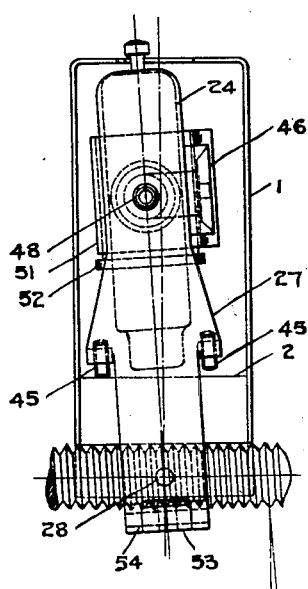
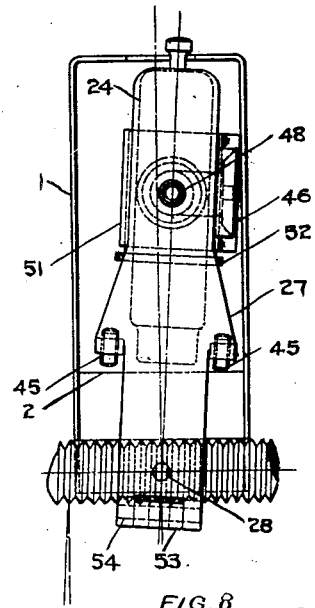
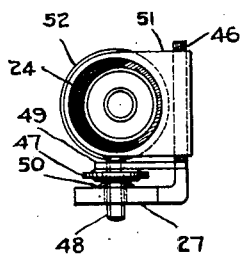
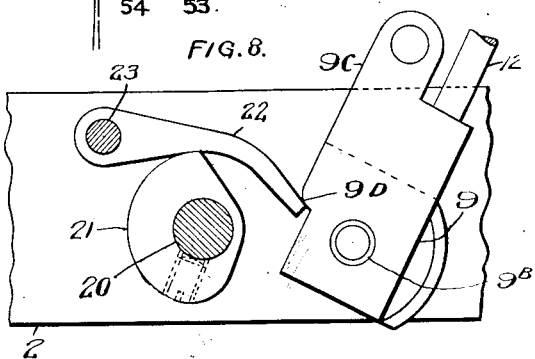

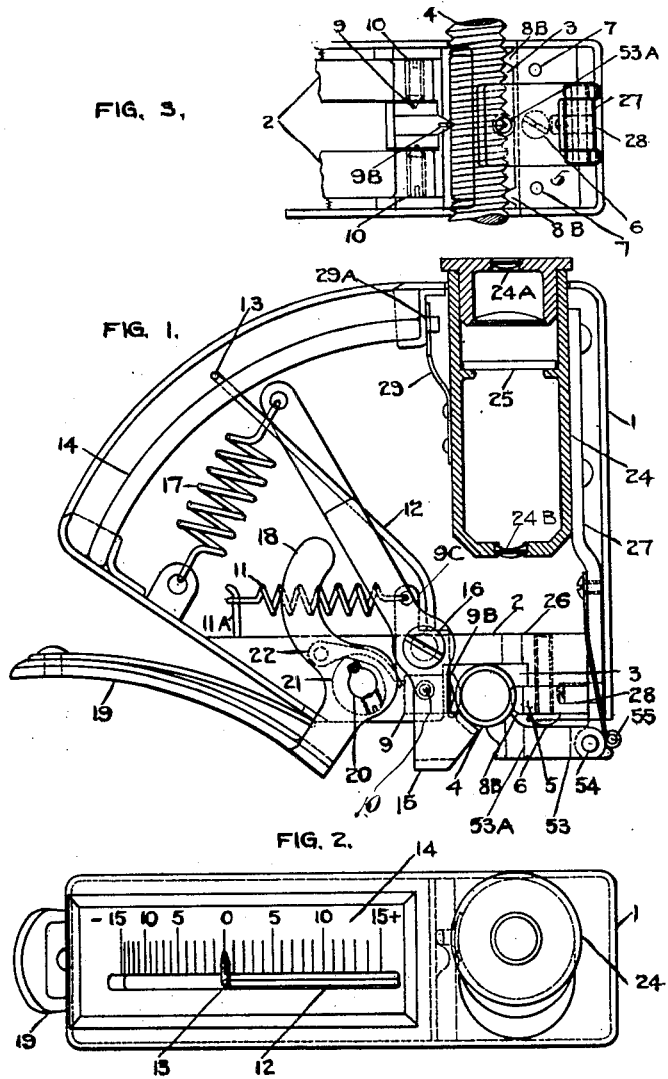

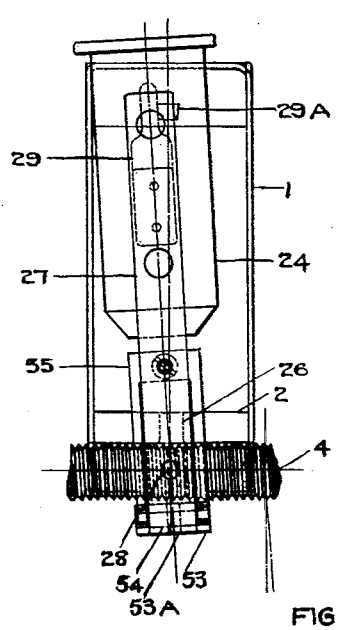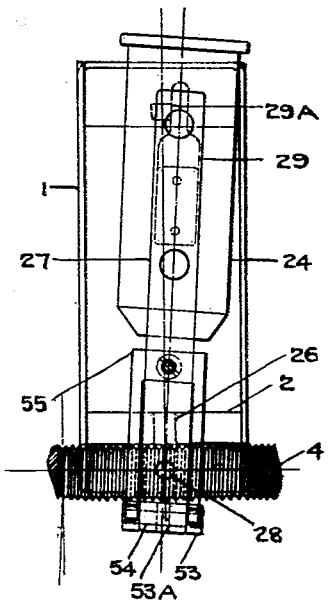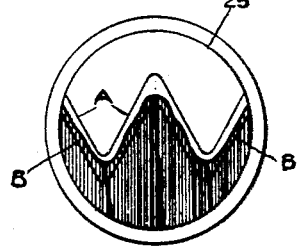

C. H. TAYLOR AND H. J. ALPE.
SCREW THREAD GAGE.
APPLICATION FILED NOV. 29, 1918.
1,354,587.
Patented Oct. 5, 1920.
4 SHEETS—SHEET 4.
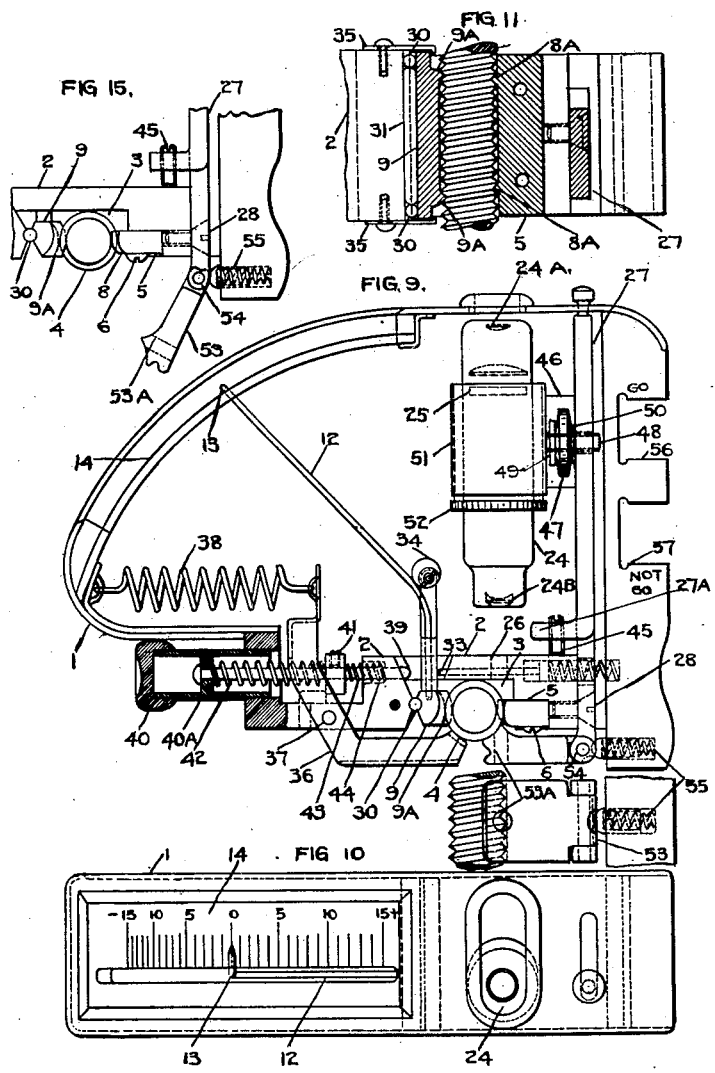

UNITED STATES PATENT OFFICE.

CHARLES H. TAYLOR, OF NEWCASTLE-UPON-TYNE, AND HAROLD J. ALPE, OF FARNBOROUGH, ENGLAND.

SCREW-THREAD GAGE.

1,354,587.  Specification of Letters Patent.  Patented Oct. 5, 1920.

Application filed November 29, 1918. Serial No. 264,526.

*To all whom it may concern:*

Be it known that we, CHARLES HAROLD TAYLOR, aircraft engineer, and HAROLD JAMES ALPE, technical assistant, Royal Aircraft Factory, subjects of the King of England, and residents, respectively, of Victoria Works, St. Lawrence Road, Newcastle-upon-Tyne, England, and of The Firs, Reading Road, Farnborough, Hants, England, have invented new and useful Improvements in Screw-Thread Gages, of which the following is a specification.

This invention relates to gages or measuring instruments for measuring and examining male or external screw threads, wherein the screw to be measured is inserted between two or more fixed gage points or members and one or more movable gage points or members.

The present invention has for its object to provide a reliable gage or measuring instrument of this type in a convenient or portable form, which will enable errors over any predetermined length of screw to be readily and accurately determined, with a view to obtaining a greater degree of accuracy and interchangeability in screw thread work.

According to the present invention the gage points or members are located on each side of the screw to be measured. The fixed gage points or members comprising a plurality of teeth of the correct form of the thread extending over a length of screw equal to that which it is desired to measure, the teeth being adapted to engage one side of the screw to be measured. The movable gage member or members are located diametrically opposite the fixed gage points and provided with one or more gage points of curved profile and shaped to the correct form of the thread to engage the screw. The movable gage member or members are pivoted slightly eccentrically, relative to the curvature of the gage point or points, and are connected to a multiplying lever movable over a suitable indicator or scale.

The fixed gage member or members may, if desired, consist of a portion of a nut of the maximum size corresponding to the screw to be measured, thus constituting a maximum limit gage.

If found desirable two or more movable gage members of the type described may be provided.

The screw may be held firmly in the gap between the gage members by a spring-controlled lever or clip and means may be provided for withdrawing the movable gage member and clip from the work to enable the latter to be inserted in position and for releasing the clip to secure the work just previous to the engagement of the movable gage member with the screw threads.

The whole of the parts are adapted to be mounted in a compact and portable casing.

The apparatus hereinbefore described enables errors in the pitch, effective diameter, slope, or full or core diameter of the screw thread to be readily indicated, but in order to provide efficient means for ascertaining the actual form of the screw thread, a microscope or similar optical instrument may be provided having a diagram interposed between the lenses, this diagram representing the correct profile of the screw thread or the maximum and minimum profile forms of the correct screw thread. The microscope may be so arranged in relation to the gage points that its axis will be in line with the rake or slope of the screw thread, thus enabling a clear and sharp image of the latter to be obtained.

By means of the optical device described, it is possible to obtain a direct visual comparison between the diagram and the virtual image of the screw thread, as seen through the microscope, thus enabling errors in the profile of the screw thread to be readily detected.

For examining reversed or left hand threads, the microscope may be pivotally mounted so as to permit it to be swung over until its axis is in line with the rake of the reversed thread.

Our improved screw thread gage is illustrated by the accompanying drawings, whereon—

Figure 1 is an elevation of one construction of the gage with the side plate of the casing removed to show the interior mechanism and showing the microscope in section.

Fig. 2 is a plan of the instrument.

Fig. 3 is an inverted detail plan view of the gage points showing a portion of a screw in position.

Figs. 4 and 5 are diagrammatic views of the microscope as applied to right-hand and left-hand threads respectively.

Fig. 6 is a magnified view of the screw thread as seen through the microscope, showing how a comparison is made between the actual screw and a diagram of correct formation.

Figs. 7 and 8 are details showing two positions of the mechanism hereinafter described.

Figs. 9, 10, 11, 12 and 13 are views corresponding to Figs. 1 to 5 showing a modified construction of the improved screw-thread gage.

Fig. 14 is a detail plan view of the microscope shown in Figs. 9 to 13.

Fig. 15 is a fragmentary view of the lower part of the gage shown in Fig. 9.

As shown on the drawings, the improved gage comprises a casing 1 within which is secured a block 2 having a gap or recess 3 adapted to receive the screw 4 to be measured. A fixed gage member 5 is secured to the block 2 on one side of the gap 3 by means of a screw 6, the fixed gage member 5 having two projecting teeth $8^A$ (Fig. 11) or $8^B$ (Fig. 3), preferably situated at a distance apart equal to an odd number of pitches of the correct screw-thread for which the gage is designed. As shown in Figs. 1 and 9 the teeth are slightly curved outwardly toward the entrance of the gap 3 to facilitate the entry of the screw 4 into position. It will be understood that the faces of the teeth $8^B$ (Fig. 3) are cut to the correct form of the thread and that the crests of the teeth may be truncated (as in Fig. 3) in accordance with the usual practice when it is not desired to take into account errors on full or core diameter. The teeth may, however, be of the correct profile of the thread as shown at $8^A$ in Fig. 11, and in this instance they register the greatest error or combination of errors that exist including full or core diameter. 7 are locating pins for the fixed gage member 5.

Diametrically opposite the fixed gage member 5 is mounted a movable gage member 9 having one or more curved gage points $9^A$ beveled to the correct form of the thread, and provided if desired with a hardened center piece $9^B$, as in Fig. 3, the curved gage points $9^A$ being if desired truncated so as not to engage the full depth of the thread. As shown in Figs. 1 and 3 the movable gage member 9 is pivoted on centers 10 at a point slightly eccentric to the curved gage point $9^B$, the centers 10 being supported in the block 2. An upward extension $9^C$ of the movable gage member 9 serves as a connection for one end of a spring 11 secured at $11^A$ to the block 2, the spring 11 tending to maintain the gage point $9^b$ in contact with the screw 4. A multiplying lever 12 is secured to the movable gage member 9 and carries at its extremity an index 13 adapted to move over a graduated scale 14 supported in the casing 1.

The screw 4 is held firmly in the gap 3 during the testing operation by means of a lever or clip 15 pivoted at 16 in the block 2 and maintained in engagement with the screw 4 by a spring 17, thereby obviating the possibility of a false reading being obtained on the scale 14 due to relative movement of the screw 4 and gage members 5 and 9.

In order to keep the gage point $9^B$ (Fig. 1) of the movable gage member 9 out of contact with the screw 4 until the latter is firmly gripped by the clip 15, the clip 15 is adapted to be operated by an arm 18 carried by a hand lever 19 which extends outside the casing 1. The hand lever 19 is pivoted in the block 2 by means of a pin 20 secured to the hand lever and carrying a cam 21 (Figs. 1, 7 and 8) adapted to engage a lever or tappet 22, one end of which is pivoted at 23 in the block 2 while the free end engages a curved shoulder $9^D$ on the movable gage member 9.

In order to insert the screw 4 in position, the hand lever 19 is pressed inward until the arm 18 forces over the clip 15 to a sufficient extent to enable the screw 4 to enter the gap 3. At the same time, the cam 21 coöperating with the tappet 22, tilts the movable gage member 9 into the position shown in Fig. 8, thus withdrawing the gage point $9^B$ from the gap 3. On releasing the hand lever 19, the clip 15 will first of all engage the screw 4 and thereafter the movable gage member will return until the gage point $9^B$ engages the screw thread, whereupon any errors in the screw thread will be registered by the index 13 on the scale 14.

The employment of the two fixed gage points $8^B$ enables error in the pitch of the screw to be registered as well as errors in the effective diameter of the thread. Thus, for example, if there is an error in the pitch of the thread, the two gage points $8^B$ will not fully enter the thread but will engage one slope thereof and the pitch error will consequently be transmitted by the movable gage member 9 and registered as an error in the effective diameter. Similarly, an error in the slope or angle of the thread will be registered as an error in the effective diameter, the index 13 registering in each case according to the total amount of interference caused by errors in pitch, effective diameter or slope.

This method of registering the errors is considered advantageous as it enables the amount of interference to be determined between the screw and a nut of standard dimensions.

If desired, as shown in Figs. 9 and 11, two movable gage points 9$^A$ may be provided at a distance apart differing from that of the gage teeth 8$^A$ by one or more pitches of the thread, the two movable gage points 9$^A$ being preferably carried by a single movable member 9 so as to give a single reading on the scale 14. In order to allow adjustment for the two gage points 9$^A$, the member 9 in this case is centered by two or more balls 30 located in recesses in the member 9 and block 2 and spaced apart by a roller 31 at a distance greater than the distance between the gage points 9$^A$ so as to avoid tilting of the member 9. The latter is held in position laterally by end caps 35 secured to the block 2 and adapted to allow of a slight lateral movement of the member 9.

By the use of two movable gage points, the amount of interference registered, due to pitch errors, will be increased as compared with a single centrally disposed movable gage point, for the reason that the latter would enter the screw thread to a greater extent than the two movable gage points. Moreover, if the latter are spaced at a distance apart equal to the thickness of the standard nut, they will register the actual interference of the screw with the nut.

It should be understood that the gage points may be at any suitable distance apart to suit the actual length of engagement of the thread which is required on the work.

In the construction illustrated in Figs. 9 to 15, the gage member 9 swings about the roller 31 and is maintained in contact with the screw by a spring pin 33 and is provided at its upper end with an eccentric 34 engaging the multiplying lever 12. By rotating the eccentric 34 the lever 12 may be set to zero position for any size of screw. The screw is held within the gap 3 by a lever 36 pivoted at 37 in the block 2 and controlled by a spring 38.

When inserting the screw, the gage member 9 is tilted, until the lever 36 engages the screw, by means of a pin 39 carried loosely by a plunger 40, the pin 39 passing through the block 2 and through a guide aperture in a web 40$^A$ in the plunger 40. On the pin 39 is fixed a collar 41 forming an abutment for two springs 42 and 43 carried by the pin, the spring 43 fitting in a recess 44 in the block 2 while the spring 42 abuts against the web 40$^A$.

On pressing the plunger 40 inwardly, the pin 39 is forced inward, thereby tilting the gage member 9. On the further movement of the plunger 40, the latter abuts against the lever 36, rocking the latter on its pivot, while the outer end of the pin 39 slides through the web 40$^A$. Similarly on releasing the plunger 40, the lever 36 will first engage the screw, and thereupon the pin 39 will be returned by the spring 42 and allow the gage member 9 to engage the screw under the action of the spring pin 33.

In order to enable the actual form of the screw thread to be readily examined, a microscope 24 may be provided having a limit diagram 25 interposed between the eye-piece 24$^A$ and object lens 24$^B$. The limit diagram 25 is illustrated in Fig. 6 and comprises hair lines A and B representing respectively the maximum and minimum profile of the correct screw thread. The shaded portion in Fig. 6 represents the virtual image of the screw thread as seen through the microscope and clearly shows how a direct visual comparison may be obtained between the limit diagram and the virtual image of the screw thread.

To enable a clear and sharp image of the screw thread to be obtained, it is necessary that the axis of the microscope should be in line with the rake or slope of the screw thread, as indicated in Fig. 4.

The microscope 24 is preferably supported in the casing 1 over an aperture 26 in the block 2 by means of an arm 27 pivoted at its lower end by means of a pin 28 in the block 2, thereby enabling the microscope to be swung over into the position shown in Figs. 5 and 13 for the purpose of examining reversed or left-hand threads. The microscopes may be secured in either position by means of a spring tongue 29 (Figs. 4 and 5) adapted to ride over a projection 29$^A$ on the casing 1, or as shown in Figs. 9 to 13, the movement of the microscope may be limited by stops 45 adjustable in a projection 27$^A$ on the arm 27, and adapted to abut against the block 2.

The microscope may be adjustably mounted on the arm 27, in order to enable it to be adjusted to accommodate various sizes of screws. In the construction shown in Figs. 9 to 14, the microscope is fitted on a horizontal slide 46 projecting from the arm 27 and is adjusted by means of a screw 48 projecting from the miscroscope and by a nut 47 threaded on the screw 48, the nut being retained in position between a guide plate 49 and a spring washer 50. The microscope may also be eccentrically supported in a sleeve 51, so that it may be adjusted therein by rotating the knurled ring 52.

In order to enable a parallel beam of light to be directed on to the screw, a block 53 (Figs. 9 to 15) may be carried by the arm 27 so as to move with the microscope, the block 53 having an aperture 53$^A$ to admit light to that part of the screw which is under examination. To enable the screw to be removed, the block 53 is pivoted to the arm 27 at 54 and is retained in normal position by a spring pin 55 engaging recesses in the end of the block 53.

The outer casing of the instrument may be constructed to form maximum and minimum gap gages 56 and 57 as shown in Fig. 9.

We claim:

1. A screw-thread gage comprising a fixed gage member, a diametrically opposite movable gage member having a curved profile, means for pivoting said movable gage member eccentrically in relation to its curved profile, and a registering device operable from said movable gage member.

2. A screw thread gage comprising a fixed gage member, a diametrically opposite movable gage member having a curved profile, means for pivoting said gage member eccentrically in relation to its curved profile, a casing inclosing the aforesaid elements, a graduated scale in one side of said casing, an index connected to said movable gage member and adapted to traverse said scale, mechanism operated externally of the casing for actuating the movable gage member to enable insertion and withdrawal of the screw thread, and a spring clip for holding the screw thread in position for examination.

3. A screw thread gage comprising a fixed gage member, an oppositely located movable gage member having a curved profile, a roller forming a pivot for said movable gage-member, means for holding the movable gage member in position allowing it slight lateral movement, a casing inclosing the aforesaid elements, a graduated scale on one side of said casing, an index connected to said movable gage member and adapted to pass over said scale, means outside of the said casing for actuating the movable gage member to enable insertion and withdrawal of the screw thread, and a spring clip for holding the screw thread in position for examination.

4. A screw thread gage as specified in claim 3, in which a spring actuated pin is provided for holding the movable gage member in contact with the screw thread to be examined.

5. A screw thread gage as specified in claim 3, in which the movable gage member is provided with an eccentric adapted to engage the index for adjusting the same.

6. A screw thread gage as specified in claim 3, comprising also means in combination with the roller for centering the movable gage member.

7. A screw thread gage as specified in claim 3, in which the means outside of the casing for actuating the movable gage member consists in a plunger, a pin loosely carried by said plunger and adapted to engage the movable gage member, a collar on said pin, two coiled springs carried by said pin and abutting against said collar from opposite sides thereof, the said pin on the said plunger being pressed inwardly tilting the movable gage member to enable insertion and withdrawal of the screw thread.

In testimony whereof we have signed our names to this specification in the presence of subscribing witnesses.

CH. H. TAYLOR.
H. J. ALPE.

Witnesses as to signature of Ch. H. Taylor:
WALTER C. HAMM,
ARCH. P. MACFARLANE,
PETER FERGUSON RIDLEY.

Witnesses as to the signature of H. J. Alpe:
CHAS. HAWKER,
F. A. HOWARD.